US008905241B2

(12) United States Patent
Rush et al.

(10) Patent No.: US 8,905,241 B2
(45) Date of Patent: Dec. 9, 2014

(54) METHODS FOR TREATING BOTTOM ASH GENERATED FROM WASTE-TO-ENERGY FACILITIES TO REDUCE THE DEPENDENCE ON BONDING AGENTS SUCH AS LIME OR CONCRETE PRIOR TO DISPOSAL

(71) Applicants: Michael Brandon Rush, Draper, UT (US); Gregory Scott Rush, Lehi, UT (US)

(72) Inventors: Michael Brandon Rush, Draper, UT (US); Gregory Scott Rush, Lehi, UT (US)

( * ) Notice: Subject to any disclaimer, the term of this patent is extended or adjusted under 35 U.S.C. 154(b) by 0 days.

(21) Appl. No.: 14/133,222

(22) Filed: Dec. 18, 2013

(65) Prior Publication Data

US 2014/0202931 A1   Jul. 24, 2014

Related U.S. Application Data

(60) Provisional application No. 61/755,859, filed on Jan. 23, 2013.

(51) Int. Cl.
*B03D 3/00* (2006.01)
*B03B 7/00* (2006.01)

(52) U.S. Cl.
CPC ........................................ *B03B 7/00* (2013.01)
USPC .................. 209/3; 209/10; 106/704; 106/705

(58) Field of Classification Search
USPC ......... 209/1, 2, 3, 10, 422; 428/406; 427/193; 44/406, 620; 106/701, 704, 705
See application file for complete search history.

(56) References Cited

U.S. PATENT DOCUMENTS

| | | | | |
|---|---|---|---|---|
| 4,212,682 A * | 7/1980 | Burkett | ......................... | 106/405 |
| 5,196,620 A * | 3/1993 | Gustin et al. | .................. | 588/257 |
| 5,860,908 A * | 1/1999 | Forrester | ...................... | 588/256 |
| 6,269,952 B1 * | 8/2001 | Watt et al. | ......................... | 209/3 |
| 8,696,770 B2 * | 4/2014 | Jeong | .............................. | 44/620 |
| 2014/0202931 A1 * | 7/2014 | Rush et al. | ........................ | 209/3 |

* cited by examiner

Primary Examiner — Terrell Matthews
(74) Attorney, Agent, or Firm — Robert L Payne; David C. Castlebelly; Steven E. Rush

(57) ABSTRACT

A method to significantly reduce the need for treating bottom ash with a bonding agent, such as lime or concrete, as is typically done by Waste-to-Energy facilities within the United States of America. Furthermore it is a method that will greatly reduce the costs associated with freight, and disposal typically associated with WTE bottom ash by extracting excess water, metallic, and eliminating the need for supplemental additives such as lime or concrete.

1 Claim, 7 Drawing Sheets

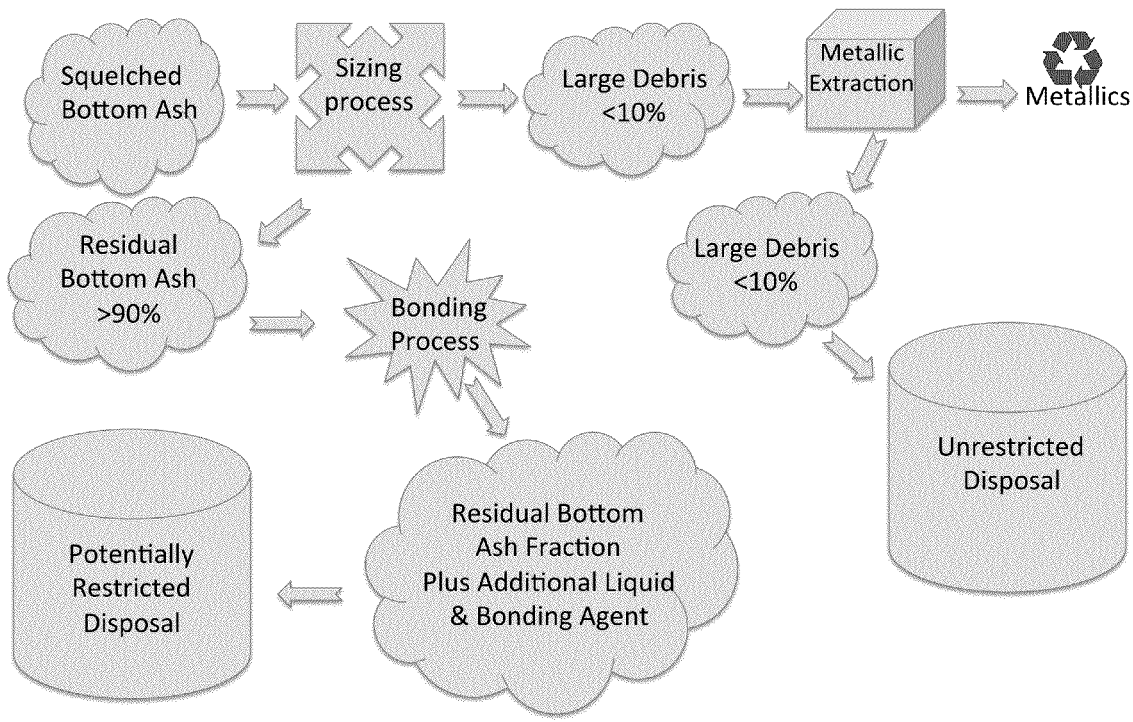
Figure 1 – Typical Treatment Process

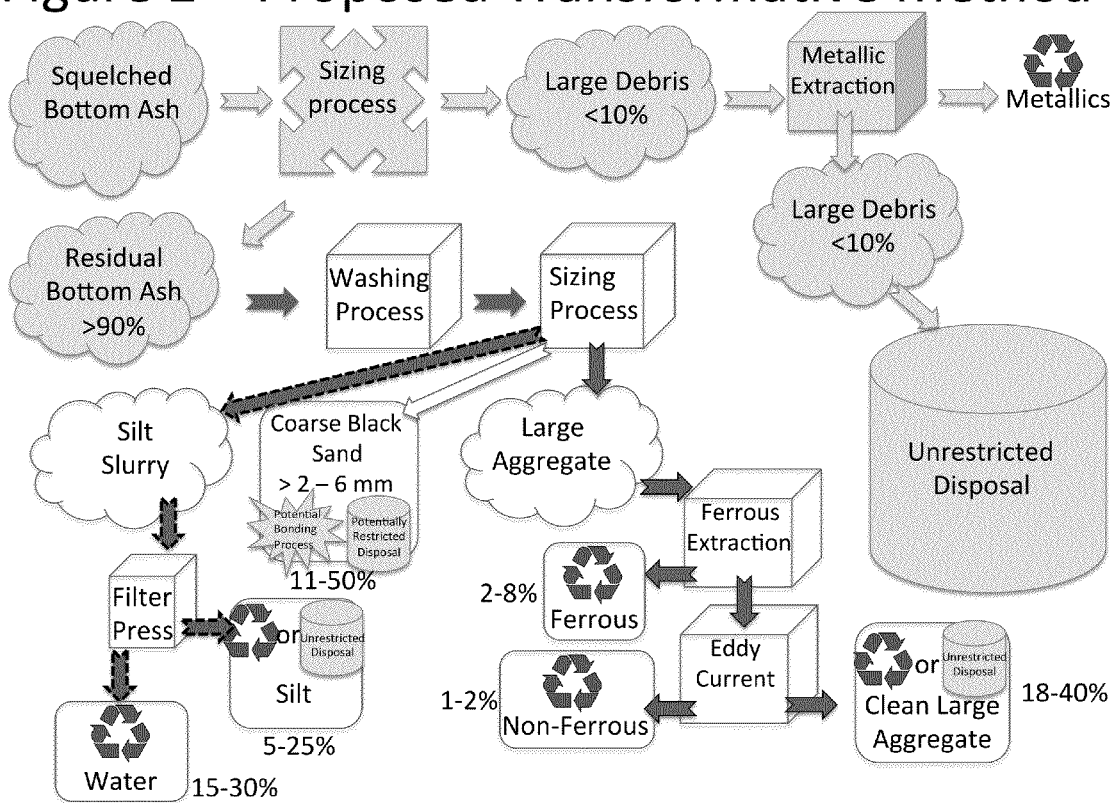
Figure 2 – Proposed Transformative Method

Figure 3 – Typical Treatment Process
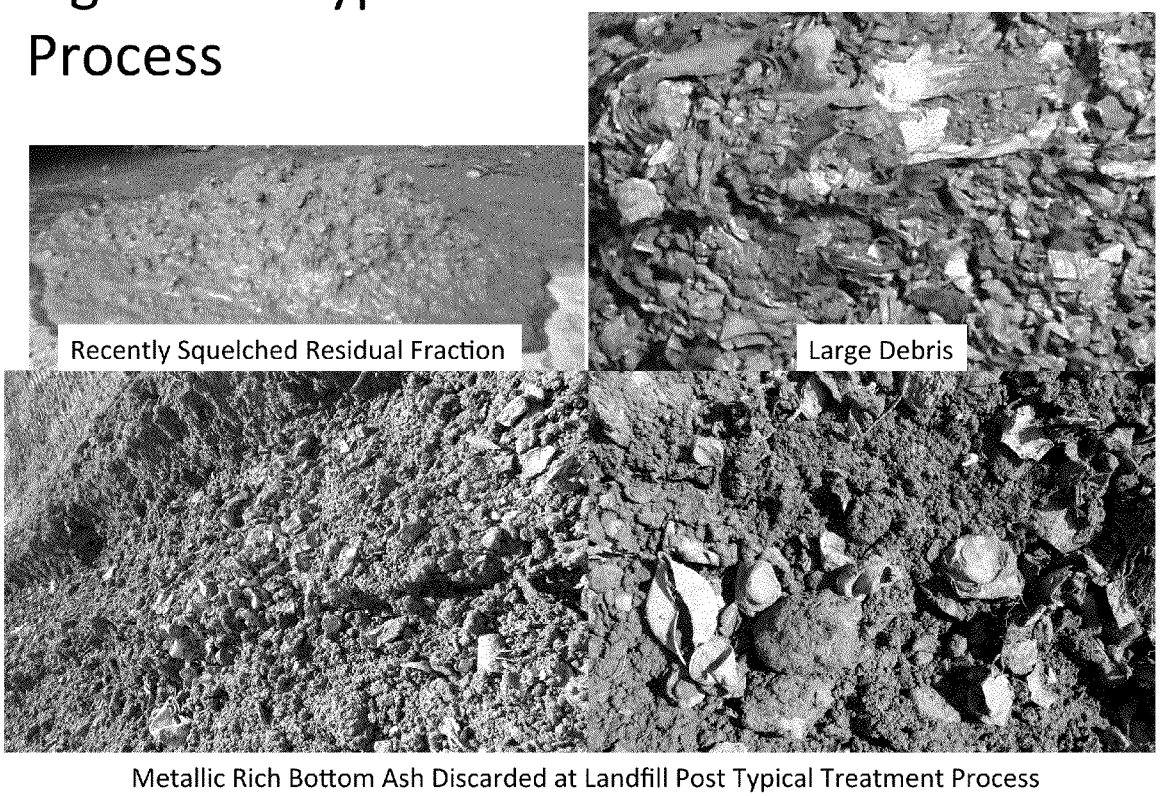
Metallic Rich Bottom Ash Discarded at Landfill Post Typical Treatment Process

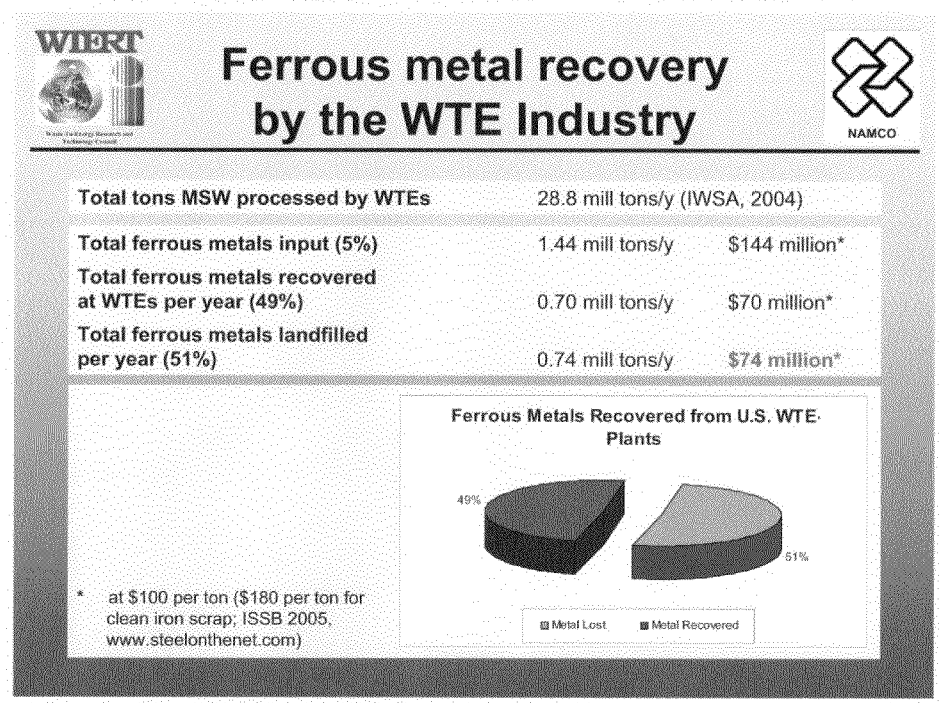

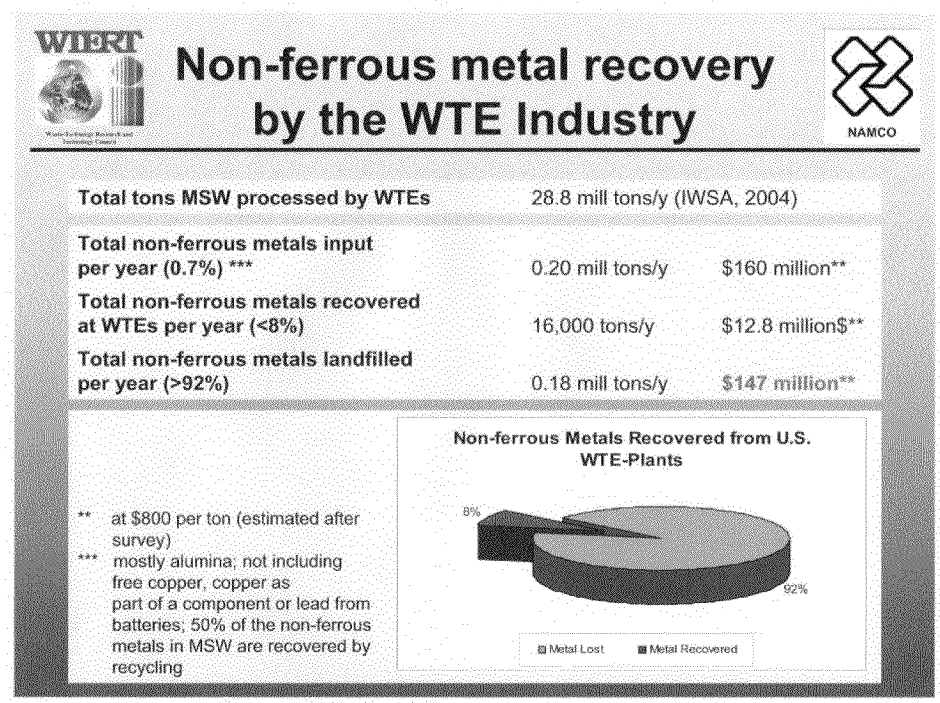

Figure 7- Testing Results

California threasholds - the most stringent in the country.

Large Clean Fraction Test Results

|  | TTLC Testing Mg/Kg | | STLC Testing Mg/L | |
| --- | --- | --- | --- | --- |
|  | TTLC Limit | Actual Results | STLC Limits | Actual Results |
| Cadmium | 100 | 1 | 1 | - |
| Copper | 2,500 | 1,024 | 25 | 1 |
| Lead | 1,000 | 18 | 5 | 2 |
| Zinc | 5,000 | 527 | 250 | 172 |

Coarse Black Sand Test Results

|  | TTLC Testing Mg/Kg | | STLC Testing Mg/L | |
| --- | --- | --- | --- | --- |
|  | TTLC Limit | Actual Results | STLC Limits | Actual Results |
| Cadmium | 100 | 13 | 1 | - |
| Copper | 2,500 | 23,726 | 25 | 2 |
| Lead | 1,000 | 892 | 5 | 1 |
| Zinc | 5,000 | 15,792 | 250 | 145 |

Silt Test Results

|  | TTLC Testing Mg/Kg | | STLC Testing Mg/L | |
| --- | --- | --- | --- | --- |
|  | TTLC Limit | Actual Results | STLC Limits | Actual Results |
| Cadmium | 100 | 3 | 1 | - |
| Copper | 2,500 | 542 | 25 | 4 |
| Lead | 1,000 | 73 | 5 | 0 |
| Zinc | 5,000 | 1,190 | 250 | 0 |

METHODS FOR TREATING BOTTOM ASH GENERATED FROM WASTE-TO-ENERGY FACILITIES TO REDUCE THE DEPENDENCE ON BONDING AGENTS SUCH AS LIME OR CONCRETE PRIOR TO DISPOSAL

BACKGROUND

Most Waste to Energy ("WTE") facilities in the United States were built 20 plus years ago, when commodities were not as valuable as they are today. As such they were not built with a particular emphasis in maximizing the recovery of ferrous and non-ferrous metallics present in the bottom ash, nor were they built with an emphasis of minimizing the bonding agents required to treat the bottom ash for soluble metallic content, such as lime and concrete.

The municipal solid waste "MSW" processed by these facilities typically contains around 1% non-ferrous metals, such as aluminum, copper, zinc, and lead. These metals have comparably low melting points and can melt when exposed to the high temperatures present in a furnace. Melting non-ferrous metals can result in the formation of tiny droplets of metal that separate from the larger body in the form of small sand-sized particles. This results in larger recoverable non-ferrous, and smaller more difficult to extract non-ferrous particles being present throughout the bottom ash.

Under traditional processing methods used at approximately 90 WTE facilities in the United States, it is the presence of water-soluble contaminants, including non-ferrous metals that results in the need to treat bottom ash to mitigate the potential of these metals leaching into the ground water.

Typically, as MSW is incinerated, the corresponding ash is squelched in water to mitigate fire hazard and smoke emissions. When the ash is squelched in water it tends to bind in a cementatious mixture of heterogeneous particle distribution that can retain as much as 40% moisture content. As such, it is the prevailing practice in the United States that if any attempt is made to segregate ash prior to treatment with a bonding agent, it is only the largest debris, such as that that could be removed by a rough sizing mechanism, such as a grizzly screen, a trommel, or a vibrating deck, that is removed prior to treatment. The large debris separated in this manner typically accounts for less than 10% of the bottom ash generated, and is typically the only fraction not treated with a bonding process.

Furthermore, typically only the largest WTE facilities attempt large-scale removal of non-ferrous metals from ash. For example, in the Western Continental United States there are six large incinerators producing more than 400,000 tons of bottom ash per year, none of which incorporate the use of eddy currents for non-ferrous extraction. In addition, most WTE facilities only attempt to recover metallics from the large debris. This lack of metallic recovery is not limited to the West, according to the Earth Engineering Center at Columbia University, approximately 51% of available ferrous metal, and over 92% of available non-ferrous metals are currently landfilled by existing WTE facilities in the United States, see FIGS. 5 & 6.

Even if more magnets and eddy currents were to be used, under the traditional process, they would have limited effectiveness due to the cement like property of wet bottom ash, which adheres to tramp metal like glue, reducing the recoverability of such metals, and down-grading its value if it were to be recovered under traditional methods.

As the volume of metals present in bottom ash, particularly soluble non-ferrous metals, can pose an environmental hazard, it is the prevailing practice in the United States to treat everything but the largest debris with a bonding agent, such as lime or cement, rather than removing or isolating the leachable metallics for treatment.

The practice of treating and disposing of a facility's bottom ash is expensive. A large WTE facility can spend millions of dollars a year treating its bottom ash and hauling it to a special landfill or monofill for disposal. The method proposed herein can increase the volume of debris in bottom ash not treated with a bonding agent from 35% to as much as 100%, thereby greatly reducing processing and disposal costs typically associated with WTE bottom ash.

BRIEF SUMMARY OF THE INVENTION

The present invention comprises novel methods and processes which greatly reduce the need to treat bottom ash with bonding agents such as lime or concrete and results in significantly enhanced revenue streams from ferrous and non-ferrous metals that, if not for this invention, would not have been recovered. Furthermore it is an invention wherein the cementatious bonds typical of bottom ash, are eliminated through a process of rigorous washing, sizing, classifying, and dewatering the various fractions present within the bottom ash, and then removing the ferrous and non-ferrous metals present in certain cleaned and classified fractions via both stationary and rapidly changing magnetic fields; such as those created by magnets and eddy currents, while concentrating smaller more difficult to remove particles of soluble non-ferrous metals into a single fraction, rather than being homogeneously mixed throughout the bottom ash.

BRIEF DESCRIPTION OF THE DRAWINGS AND CHARTS

FIG. 1 illustrates the typical ash treatment process in existing WTE facilities.

FIG. 2 illustrates one example of a method as discussed herein.

FIG. 3 shows images of WTE bottom ash processed under standard industry practices as depicted in FIG. 1.

FIG. 4 shows images of bottom ash processed under exemplary methods as discussed herein (i.e. as depicted in FIG. 2).

FIG. 5 shows slide 5 from the Werner Sunk Earth Engineering Center, Columbia University presentation given at the Waste-To-Energy Research and Technology Council in Tampa, Fla. May 2006, and represents industry standard ferrous recoveries for the WTE industry.

FIG. 6 shows slide 6 from the Werner Sunk Earth Engineering Center, Columbia University presentation given at the Waste-To-Energy Research and Technology Council in Tampa, Fla. May 2006, and represents industry standard non-ferrous recoveries for the WTE industry.

FIG. 7 Average testing results of bottom ash fractions processed under the preferred method and tested according to California's hazardous waste testing procedures which large cleaned fractions comprises two separate tests with stronger acid, and longer leaching times than the federal TCLP testing requirements. The testing results show that as a result of the preferred method, soluble non-ferrous metals have been concentrated into the fraction greater than the slurry but less than 2 mm to 6 mm. All other fractions are clean and would not require treatment with a bonding process within California.

DETAILED DESCRIPTION AND BEST MODE OF IMPLEMENTATION

In preferred embodiments, the present invention comprises novel methods and processes which transforms WTE bottom ash into value adding aggregate and metallic components. The process generally begins post MSW combustion, after the large debris has been removed. This residual fraction typically represents the fraction of the bottom ash that, if not for the proposed method, would need to be treated with a bonding agent such as lime or cement.

This residual fraction, having been squelched by water, will be a conglomerate of strongly ash-bound, heterogeneous inert aggregates, ferrous and non-ferrous metals, and partially incinerated debris. In preferred embodiments, methods and processes discussed herein may be configured to eliminate the strong ash-bond that glues the heterogeneous fractions together.

The ash-bond is overcome through a rigorous washing process, such as can be created by combining bottom ash and water in a rotating flighted drum, causing the bottom ash to tumble and mix and lessen the ash-bond, to the point that when rinsed with clean water the ash-bond rinses away in a slurry, leaving clean aggregates, metal and debris that no longer resemble bottom ash. These altered fractions can now be further classified and processed. If not done simultaneously with the washing processes, the altered clean fractions should then be segregated into distinct size fractions, and rinsed as necessary.

Depending on the scope of the project, multiple size cuts should be considered to facilitate downstream processing. In preferred embodiments, it is recommended that the smallest screen size used be 1 mm or less in size. This will enable the final slurry of rinse water and fine silt particles to be removed from the larger fractions.

The slurry of rinse water can then be introduced to a plate and filter press such as those commonly used in the wastewater treatment industry, supplemented by pumps and water and slurry storage tanks as needed. The plate and filter press will extract the water from the slurry for reuse, and present the silt in a cake. This isolated fraction may represent 8% to 25% of the total volume processed depending on screen sized utilized, with smaller screen sizes producing cleaner products than larger screens.

Based on testing performed, this fraction contains very little soluble metals and tests should fall below hazardous levels in California, which currently has the most stringent requirements in the United States. If sized properly, this fraction will not require any bonding treatment prior to recycling or disposal in an unrestricted manner, see FIG. 7.

In preferred embodiments, the fraction of rinsed aggregate larger than the slurry but smaller than 2 mm-6 mm should also be segregated from any other clean fractions. If this fraction is less than 2 mm but greater than the slurry size, it will resemble course black sand rather than bottom ash, and will contain elevated levels of non-ferrous metals due to the presence of tiny metallic droplets that were formed as the non-ferrous metals melted in the furnace.

If this fraction of rinsed bottom ash is less than 6 mm but greater than the slurry size, it will still resemble course black sand rather than bottom ash, but will contain some larger aggregates, glass, and minerals, as well as bare copper wires and some other larger non-ferrous metals that would otherwise have been recoverable under this method. Final sizing determination should be made based on the economic merit of inclusion or exclusion of recoverable non-ferrous particles larger than 2 mm but smaller than 6 mm, where 2 mm is preferred.

This method serves to isolate this fraction due to its high volume of small grain-sized soluble non-ferrous particles, so that this isolated fraction may be treated with a bonding process such a lime or concrete, rather than subjecting the entire volume of bottom ash to such a process as is typically done, see FIG. 7. Depending upon sizing, this fraction may represent 11% to 50% of the ash flow, where minimizing the volume present in this fraction is the preferred embodiment.

The fractions of the cleaned bottom ash larger than 2 mm to 6 mm may then be processed using a stationary magnetic field such as those created by an electromagnet or permanent magnet commonly used in the metal recycling industry. Due to the modified nature of this cleaned fraction, ferrous recovery will be greatly enhanced to up to 100% recovery of usable ferrous present in this fraction, including the recovery of small items such as paper clips, brads, tacks, and even staples. Without this process, typically all of the metal available in this fraction would have been discarded. Any metals recovered from this fraction under traditional methods will be caked in ash, which will adversely impact their market value compared to the cleaned ferrous products recovered under this method, see FIGS. 3 and 4.

In this exemplary embodiment, after being processed by a stationary magnetic field, the cleaned fractions may be further processed with a rapidly changing magnetic field such as those generated by eddy currents commonly used in the metal recycling industry. The efficacy of the eddy current is also greatly enhanced due to the modified nature of this cleaned fraction. As such, the vast majority of usable non-ferrous is recovered from this fraction. The WTE industry presently discards over 90% of the available non-ferrous, see FIG. 6. Furthermore, the non-ferrous metals recovered with this process will have a significantly enhanced market value compared to those sold under other methods, see FIGS. 3 and 4.

In this exemplary embodiment, after being processed by the eddy current, the cleaned fraction generally consists of inert materials such as glass, ceramic, aggregate, and minerals, and similar to the other products under this method, no longer resembles bottom ash. The majority of usable metallics will have been removed, and the fraction may contain only trace amounts of soluble metals. As such, this fraction should test below the hazardous material thresholds of even the most rigorous state requirements, such as those in place in the state of California, see FIG. 7. Such an aggregate may have use as a stabilizing ground cover in landfills during winter months, and will not need to be treated with a bonding agent prior to reuse or disposal in an unrestricted manner.

SUMMARY OF SOME PREFERRED EMBODIMENTS OF THE INVENTION

A method to transform bottom ash from the WTE industry into fractions of aggregates and ferrous and non-ferrous metals, wherein leachable non-ferrous metals are isolated in such a manner that reduces the need to treat inert materials with a bonding process, thereby greatly reducing the costs typically associated with treating and disposing of bottom ash, the method generally comprising:

receiving bottom ash from an existing WTE facility after the large debris has been removed, if applicable but prior to treatment with a bonding agent;

washing this portion of bottom ash in a process of sufficient rigor as to overcome the cemenatious ash-bond typical of bottom ash, such as can be produced by combining ash and water in a mixing drum wherein the aggregates and other component parts tumble and fall repeatedly;

sizing and rinsing the aggregates and other component parts after the cementations bond has been eliminated by use of a wet screen such as those commonly found in the aggregate or mining industry wherein screen sizes can be used to moderate downstream flow, but where the following preferred sizing embodiments exist;
- 0.75 mm or less size fraction consisting of a slurry of water and silt, wherein smaller screen sizes create slurries with less soluble metals than larger sizes;
- less than 2 mm-6 mm but greater than the slurry size above, wherein such an aggregate size will contain elevated levels of soluble non-ferrous metals, and will appear like coarse black sand with visible non-ferrous particles and such fraction may be subject to restricted disposal;
- Fractions greater than 2 mm to 6 mm, wherein such fractions consists of removable ferrous and non-ferrous metals, as well as glass, aggregates, minerals and partially incinerated debris;

wherein the screening processes above effectively dewaters all fractions greater than the slurry, and the slurry is further dewatered, preferably by use of a plate and filter press such as those commonly used in the wastewater discharge industry, along with supplemental pumps and storage tanks as needed;

wherein at least 70% of the slurry water per cycle is recycled for future slurry use or rinse water;

wherein fractions greater than 2 mm to 6 mm are presented to a ferrous magnet wherein usable ferrous is recovered via magnetism at recovery rates far in excess of industry standard rates as shown in FIG. 5;

wherein fractions greater than 2 mm to 6 mm are presented to an eddy current wherein non-ferrous particles are recovered via eddy current fields at recovery rates far in excess of industry standard rates as shown in FIG. 6;

wherein remaining fraction after being processed with both magnets and eddy currents will consist primarily of inert debris and aggregates an will not be subject to restricted disposal.

We claim:

1. A method to transform bottom ash from the WTE industry into fractions of aggregates and ferrous and non-ferrous metals, wherein leachable non-ferrous metals are isolated in such a manner that reduces the need to treat inert materials with a bonding process, thereby greatly reducing the costs typically associated with treating and disposing of bottom ash, the method generally comprising:

receiving bottom ash from an existing WTE facility after the large debris has been removed, if applicable, but prior to treatment with a bonding agent;

washing the residual portion of bottom ash in a process of sufficient rigor as to overcome the cemenatious ash-bond typical of bottom ash, such as can be produced by a slurry in a mixing drum wherein the aggregates and other component parts tumble and fall repeatedly;

sizing and rinsing the aggregates and other component parts after the cementations bond has been eliminated by use of a wet screen such as those commonly found in the aggregate or mining industry wherein screen sizes can be used to moderate downstream flow, but where the following minimum sizing if used;
- 0.75 mm or less size fraction consisting of a slurry of water and silt, wherein smaller screen sizes create slurries with less soluble metals than larger sizes;
- less than 2 mm-6 mm but greater than the slurry size above, wherein such an aggregate size will contain elevated levels of soluble non-ferrous metals, and will appear like coarse black sand with visible non-ferrous particles and such fraction may be subject to restricted disposal;
- Fractions greater than 2 mm to 6 mm, wherein such fractions consists of removable ferrous and non-ferrous metals, as well as glass, aggregates, minerals and partially incinerated debris;

wherein the screening processes above effectively dewaters all fractions greater than the slurry, and the slurry is further dewatered, preferably by use of a plate and filter press such as those commonly used in the waste water discharge industry, along with supplemental pumps and water storage tanks as needed;

wherein at least 70% of the slurry water per cycle is recycled for future slurry use or rinse water;

wherein fractions greater than 2 mm to 6 mm are presented to a ferrous magnet wherein usable ferrous is recovered via magnetism;

wherein fractions greater than 2 mm to 6 mm are presented to an eddy current wherein non-ferrous particles are recovered via eddy current fields;

wherein remaining fraction, after being processed with both magnets and eddy currents will consist primarily of inert debris and aggregates.

* * * * *